United States Patent
Kamibayashi et al.

(10) Patent No.: US 7,545,943 B2
(45) Date of Patent: Jun. 9, 2009

(54) APPARATUS, METHOD, AND COMPUTER PROGRAM PRODUCT FOR PLAYING BACK CONTENT

(75) Inventors: Tooru Kamibayashi, Kanagawa (JP); Taku Kato, Kanagawa (JP); Hiroshi Isozaki, Kanagawa (JP); Tatsuyuki Matsushita, Kanagawa (JP); Atsushi Ishihara, Kanagawa (JP); Yutaka Kashihara, Kanagawa (JP); Yuji Nagai, Kanagawa (JP); Kosuke Haruki, Tokyo (JP); Yoshikata Tobita, Tokyo (JP); Seiichi Nakamura, Tokyo (JP); Masahiko Mawatari, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 383 days.

(21) Appl. No.: 10/585,854

(22) PCT Filed: Apr. 26, 2006

(86) PCT No.: PCT/JP2006/309183

§ 371 (c)(1),
(2), (4) Date: Jul. 12, 2006

(87) PCT Pub. No.: WO2006/126380

PCT Pub. Date: Nov. 30, 2006

(65) Prior Publication Data

US 2008/0226077 A1 Sep. 18, 2008

(30) Foreign Application Priority Data

May 24, 2005 (JP) ............................. 2005-151629

(51) Int. Cl.
*H04L 9/00* (2006.01)
*H04L 9/32* (2006.01)
(52) U.S. Cl. .......................... 380/277; 380/44; 713/193

(58) Field of Classification Search ....................... None
See application file for complete search history.

(56) References Cited

U.S. PATENT DOCUMENTS

| 7,305,711 | B2 * | 12/2007 | Ellison et al. ................. 726/29 |
| 2002/0087818 | A1 | 7/2002 | Ripley et al. |
| 2004/0109569 | A1 | 6/2004 | Ellison et al. |

FOREIGN PATENT DOCUMENTS

EP 1 548 732 6/2005

OTHER PUBLICATIONS

Intel Corporation et al., "Content Protection for Prerecorded Media Specification DVD Book", Revision 0.93, pp. I-X, 1-1 to 1-2 and 2-1 to 2-9, 2001.

(Continued)

*Primary Examiner*—Kaveh Abrishamkar
(74) *Attorney, Agent, or Firm*—Oblon, Spivak, McClelland, Maier & Neustadt, P.C.

(57) ABSTRACT

A content playback apparatus includes an SKF selecting unit that selects one segment key file from plural segment key files recorded in a DVD media at a time of playback of a content of the sequence key section, a data selecting unit that selects each content corresponding to a segment number of each key entry registered in the selected segment key file, a moving picture data decrypting unit that decrypts the selected moving picture data by a segment key corresponding to the segment number, and a decoder that plays back the decrypted moving picture data.

17 Claims, 15 Drawing Sheets

OTHER PUBLICATIONS

Intel Corporation et al., Advanced Access Content System (AACS) Pre-recorded Video Book, Preliminary Draft Revision 0.90, pp. I-X and 1-28, 2005.

Intel Corporation et al., "Advance Access Content System (AACS) Introduction and Common Cryptographic Elements", Preliminary Draft Revision 0.90, pp. I-XII and 1-58, 2005.

* cited by examiner

FIG.5A

SEGMENT KEY TABLE (SKT)

| | SEGMENT NUMBER FOR SEGMENT KEY #1 (SEG_NO #1) | SEGMENT KEY #1 (SEG_KEY #1) |
|---|---|---|
| SEGMENT KEY POINTER → | SEGMENT NUMBER FOR SEGMENT KEY #2 (SEG_NO #2) | SEGMENT KEY #2 (SEG_KEY #2) |
| | SEGMENT NUMBER FOR SEGMENT KEY #3 (SEG_NO #3) | SEGMENT KEY #3 (SEG_KEY #3) |
| | ⋮ | |
| | SEGMENT NUMBER FOR SEGMENT KEY #32 (SEG_NO #32) | SEGMENT KEY #32 (SEG_KEY #32) |

FIG.5B

EXAMPLE OF SKT

| SEG_NO #1 = 1 | SEGMENT KEY #1 (SEG_KEY #1) |
|---|---|
| SEG_NO #2 = 6 | SEGMENT KEY #2 (SEG_KEY #2) |
| ⋮ | |
| SEG_NO #32 = 8 | SEGMENT KEY #32 (SEG_KEY #32) |

FIG.9A

ILVU ADDRESS TABLE

| SEQ_C1_DSTA |
|---|
| SEQ_C2_DSTA |
| SEQ_C3_DSTA |
| SEQ_C4_DSTA |
| SEQ_C5_DSTA |
| SEQ_C6_DSTA |
| SEQ_C7_DSTA |
| SEQ_C8_DSTA |
| SEQ_C9_DSTA |

FIG.9B

EXAMPLE (SEGMENT NUMBER =2)

| 0x7FFFFFFFFFFF(INVALID) |
|---|
| ADDRESS & SIZE OF NEXT ILVU |
| 0x7FFFFFFFFFFF(INVALID) |
| 0x7FFFFFFFFFFF(INVALID) |
| 0x7FFFFFFFFFFF(INVALID) |
| 0x7FFFFFFFFFFF(INVALID) |
| 0x7FFFFFFFFFFF(INVALID) |
| 0x7FFFFFFFFFFF(INVALID) |
| 0x7FFFFFFFFFFF(INVALID) |

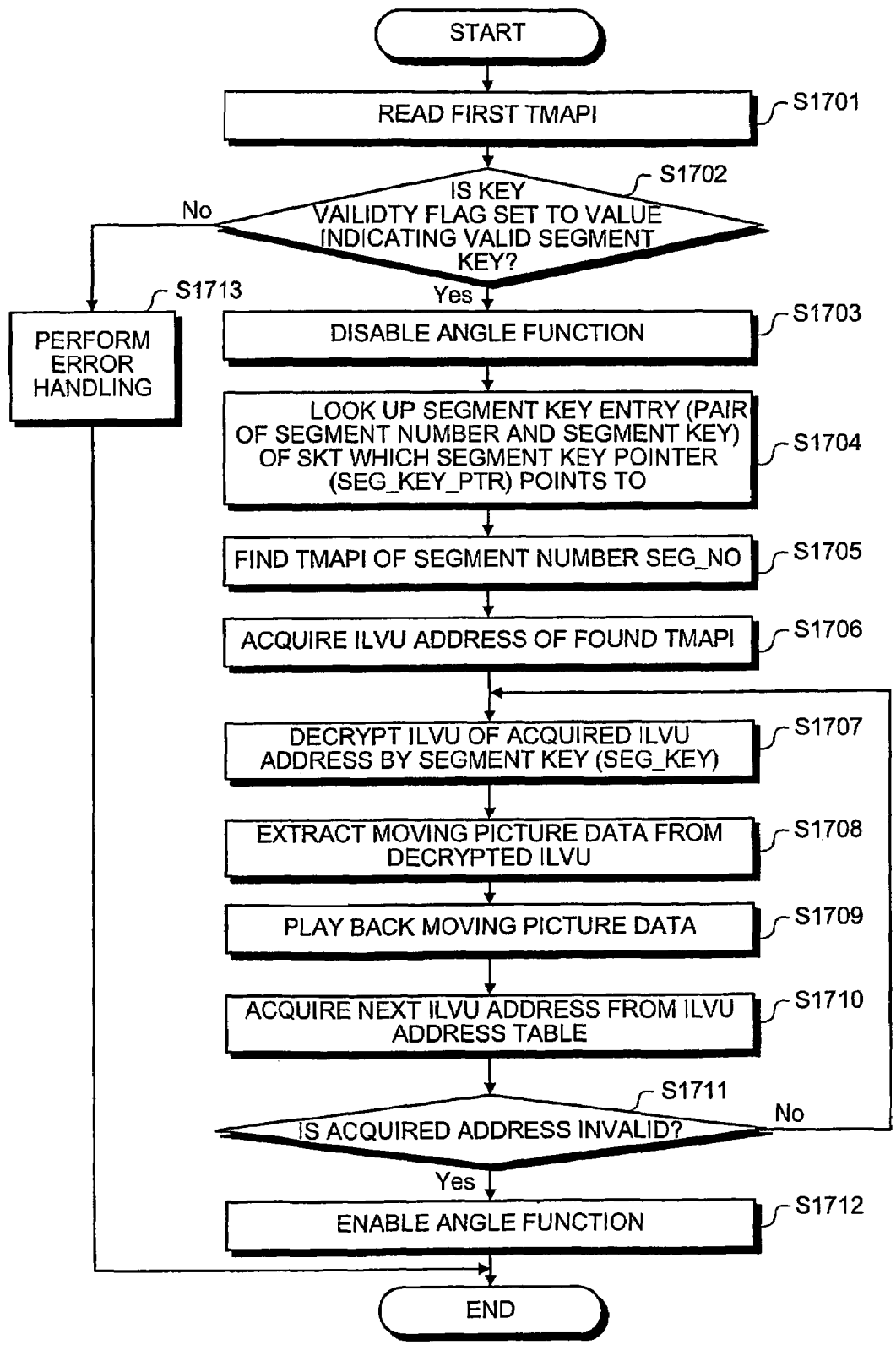

APPARATUS, METHOD, AND COMPUTER PROGRAM PRODUCT FOR PLAYING BACK CONTENT

TECHNICAL FIELD

The present invention relates to a content playback apparatus, a method of content playback, and a computer program product therefor, according to which content such as moving picture data is played back, and more particularly the present invention relates to a technique of copyright protection of content.

This application is based upon and claims the benefit of priority from the prior Japanese Patent Application No. 2005-151629, filed on May 24, 2005; the entire contents of which are incorporated herein by reference.

BACKGROUND ART

Conventionally, copyright protection of content has been aimed at, for example, by Content Scramble System (CSS) according to which content of a recording medium such as a digital versatile disk (DVD) is scrambled and rendered irreproducible so as to prevent an unauthorized copying thereof.

The conventional technique of copyright protection, though being capable of preventing unauthorized copying of the recorded content of the DVD, is unable to effectively block widely-practiced acts of piracy of the copyright of content in recent years. In recent years, infringers alter the structure of the DVD player itself that plays back the DVD contents so that the DVD player descrambles the DVD contents and produces plaintext contents. Then the infringers can copy the plaintext content on another recording medium such as a DVD and distribute the thus obtained pirate DVD content. Another widely observed act of piracy is an illegal peer-to-peer file exchange of content via the Internet. The conventional technique such as the CSS cannot effectively protect copyright of the content from such illegal acts. In addition, even when the pirate DVD is found, an altered DVD player employed for the manufacture of such pirate DVD cannot be identified from the content on the pirate DVD.

In order to eliminate such inconveniences, Advanced Access Content System (AACS), which is developed for a next-generation DVD video such as a High Density Digital Versatile Disk (HD-DVD), adopts a technique called Sequence Key as a technique to identify an altered DVD player which is employed for pirated production, based on Advanced Access Content System (AACS) Pre-recorded Video Book Revision 0.90 (Chapter 4).

The sequence key technique prepares plural contents that appear to be the same when observed though including minute difference with each other, and encrypts each of the plural contents with a different encryption key for recording on a recording medium. Each playback apparatus employed for playing back the content from such a recording medium, when adopting the Sequence Key technique, stores a key which allows for decryption of only one combination of contents among plural different contents. A plaintext content obtained via decryption by one playback apparatus is slightly different from another plaintext content provided via decryption by another playback apparatus. Thus, even when a pirate recording medium is manufactured via the copying of such content, a playback apparatus used for the decryption can be easily tracked back.

DISCLOSURE OF INVENTION

Conventional DVD players, however, do not adopt the Sequence Key technique, and a particular challenge is an implementation of the Sequence Key technique on a playback apparatus which plays back a next-generation DVD-Video that allows for recording of high-capacity contents.

According to one aspect of the present invention, a content playback apparatus includes a segment key file selecting unit which selects one segment key file from plural segment key files at playback of content from a sequence key section in a recording medium, the recording medium storing a video object which has plural sequence key sections that are groups of contents formed from plural pieces of encrypted contents with different minute portions and the segment key files in which a key entry that associates segment identification information that uniquely identifies a content to be played back among the plural contents in the sequence key section with a segment key that is used for decrypting a content corresponding to the segment identification information for each sequence key section; a content selecting unit which selects each content corresponding to the segment identification information of the key entry registered in the selected segment key file; a content decrypting unit which decrypts each selected content by a segment key corresponding to the segment identification information; and a playback unit which plays back each decrypted content.

According to another aspect of the present invention, a method of content playback includes selecting one segment key file from plural segment key files at playback of content from a sequence key section in a recording medium, the recording medium storing a video object which has plural sequence key sections that are groups of contents formed from plural pieces of encrypted contents with different minute portions and the segment key files in which a key entry that associates segment identification information that uniquely identifies a content to be played back among the plural contents in the sequence key section with a segment key that is used for decrypting a content corresponding to the segment identification information for each sequence key section; selecting each content corresponding to the segment identification information of the key entry registered in the selected segment key file; decrypting each selected content by a segment key corresponding to the segment identification information; and playing back each decrypted content.

A computer program product according to still another aspect of the present invention causes a computer to perform the method according to the present invention.

BRIEF DESCRIPTION OF DRAWINGS

FIG. 5A is a schematic diagram of a data structure of a Segment Key Table (SKT);

FIG. 5B shows an example of the SKT;

FIG. 9A is a diagram of a data structure of an ILVU address table;

FIG. 9B shows an example of the ILVU address table;

FIG. 17 is a flowchart of a process sequence of playback of moving picture data in the Sequence Key Sections according to a second embodiment.

BEST MODE(S) FOR CARRYING OUT-THE INVENTION

Figure 1:
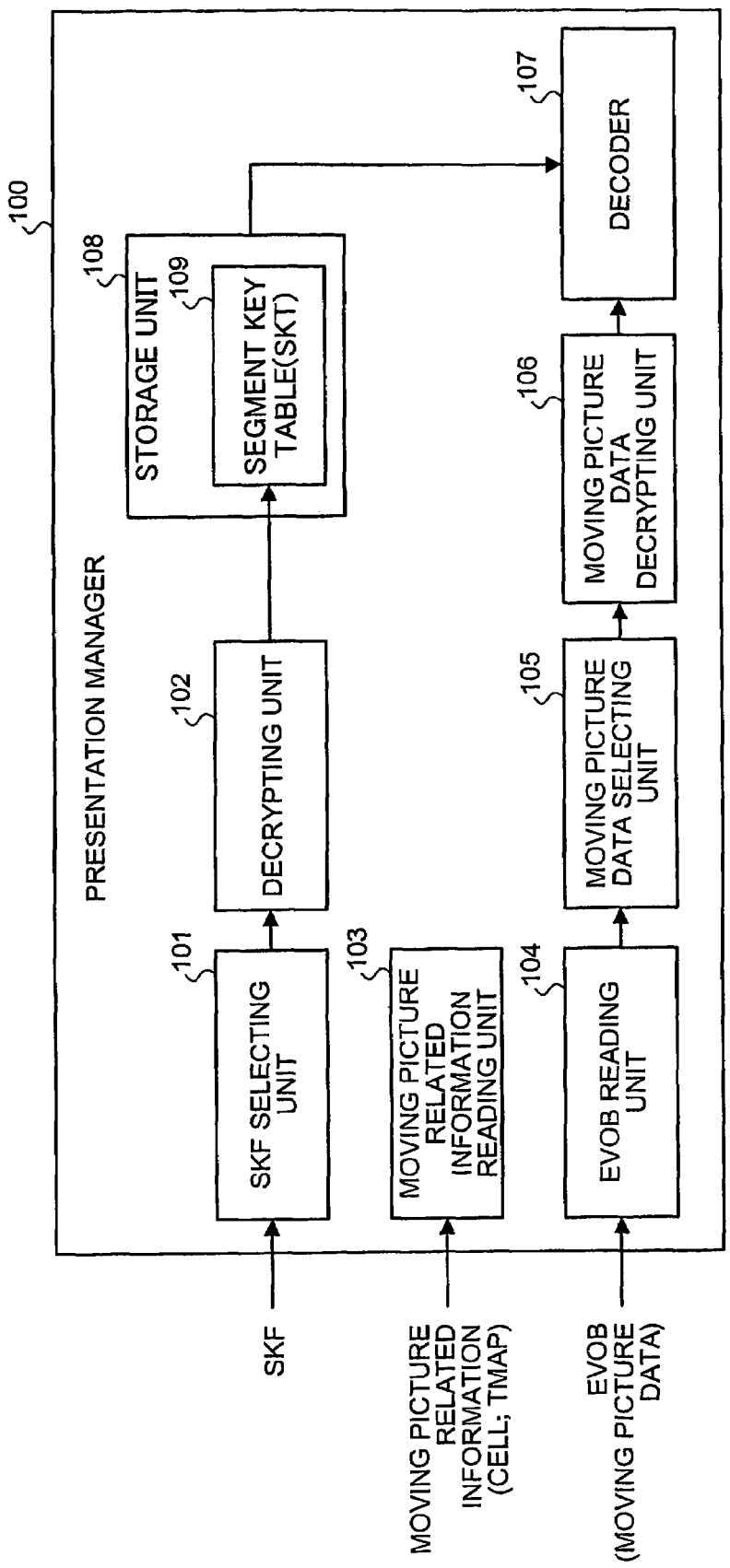
FIG. 1 is a block diagram of a main structure of a portion related with content playback in a DVD player (content playback apparatus) according to a first embodiment.

FIG. 1 is a block diagram of a main structure of a portion related with playback in a DVD player (content playback apparatus) according to a first embodiment. The DVD player according to the first embodiment plays back content such as moving picture data recorded on a DVD media by a presentation manager 100, by receiving data such as moving picture related information and moving picture data such as a Segment Key File (SKF), a cell, and TMAP described later obtained as a result of reading and processing of a recording signal of the DVD media, performing a playback of the moving picture data, and supplying the played-back moving picture and audio to a display device and an audio output device (neither shown). The presentation manager 100, as shown in FIG. 1, mainly includes an SKF selecting unit 101, a decrypting unit 102, a moving picture related information reading unit 103, an Enhanced Video Object Block (EVOB) reading unit 104, a moving picture data selecting unit 105, a moving picture data decrypting unit 106, a decoder 107, and a storage unit 108.

Here, a recording medium employed for the DVD player according to the first embodiment is a DVD media for HD-DVD Video such as a High Density Digital Versatile Disk, though not limited thereto.

The SKF selecting unit 101 is a processing unit that receives 1024 Segment Key Files (SKF) in data read out from the DVD media and selects one SKF corresponding to the DVD player. Here, the SKF is a file containing a Key Entry which associates a Segment Number with a Segment Key for each Sequence Key Section which is made up of Interleaved Units (ILVUs) in an EVOB described later. The Segment Number is segment identification information for uniquely identifying a content to be played back among plural contents in the corresponding Sequence Key Section. The Segment Key is a decryption key for a content corresponding to the pertinent Segment Number. The SKF is recorded in the DVD-Video media in an encrypted form. The SKF will be described later in detail.

The decrypting unit 102 decrypts one encrypted SKF selected by the SKF selecting unit 101 by a Volume Unique Key recorded in the DVD media in advance, to store each decrypted Key Entry in a Segment Key Table 109 in the storage unit 108.

The moving picture related information reading unit 103 receives and reads information related with a moving picture such as a cell and a TMAP which are control information for the playback of the moving picture data among data read out from the DVD media.

The EVOB reading unit 104 receives an EVOB, in which content such as moving picture data is recorded in an encrypted form among the data read out from the DVD media.

The moving picture data selecting unit 105 selects an ILVU which contains a content designated by the Segment Key from the EVOB received by the EVOB reading unit 104, and selects moving picture data encrypted by the Segment Key from the selected ILUV.

The moving picture data decoding unit 106 decodes the moving picture data selected by the moving picture data selecting unit 105 by the Segment Key. The decoder 107 is a playback unit that plays back the moving picture data decrypted by the moving picture data decrypting unit 107.

The storage unit 108 is a storage medium such as a memory where the Segment Key Table (SKT) is stored. The SKT will be described later in detail.

Next, the Sequence Key technique is described. The Sequence Key technique serves to prevent the distribution of pirate DVDs by identifying an apparatus employed for an illegal copying based on played-back content obtained from the pirate DVD when a person illegally copies the content of a DVD media in bad faith and plays back the content therefrom.

Figure 2:
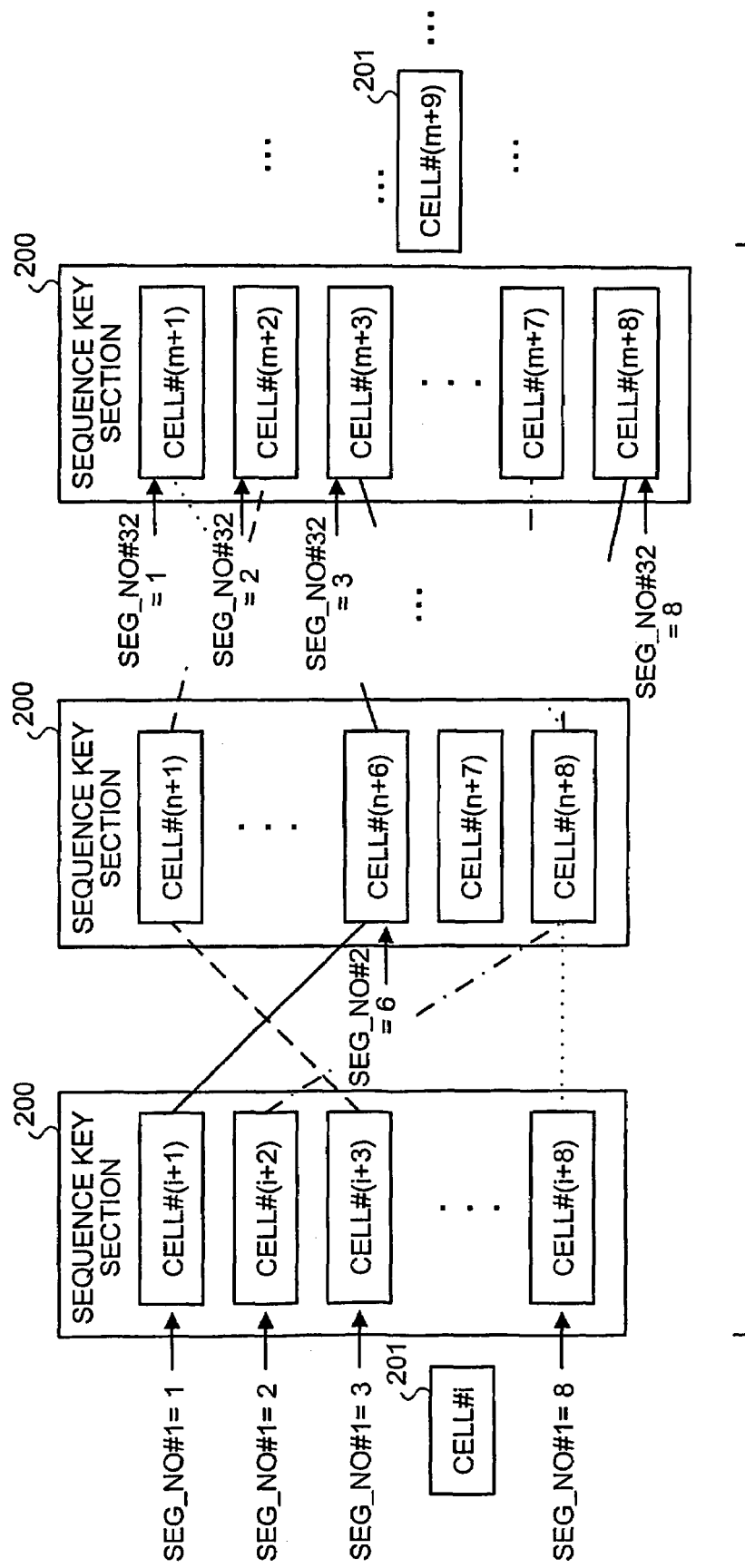
FIG. 2 is a schematic diagram of an overview of a Sequence Key technique.

FIG. 2 is a schematic diagram of an overview of the Sequence Key technique. In an EVOB, eight pieces of moving picture data are prepared. Each of the eight pieces of moving picture data contains the same content with a difference in a minute portion or a different electronic watermark. The group of eight pieces of moving picture data is defined as a Sequence Key Section to distinguish from other pieces of moving picture data. Further, eight cells corresponding to eight pieces of moving picture data are defined so as to be included in the Sequence Key Section. In each EVOB, 32 Sequence Key Sections are provided.

One piece of moving picture data in each group of eight pieces of moving picture data is selected, in other words, one piece of moving picture data from each of 32 Sequence Key Sections is selected and associated with each other. Then, $8^{32}$ sets of moving picture data combination can be obtained. Among the $8^{32}$ combinations, 1024 sets will be used here. In FIG. 2, an exemplary Sequence Key Section 200 containing cells with moving picture data and an ordinary cell 201 are shown. In FIG. 2, SEG_NO #n=m represents moving picture data located m-th in the n-th Sequence Key Section. In the example of FIG. 2, combinations of moving picture data are shown in an order of the first to the 32nd Sequence Key Sections, as "1st moving picture data, 6th moving picture data, . . . , 3rd moving picture data," "2nd moving picture data, 8th moving picture data, . . . , 7th moving picture data," "3rd moving picture data, 1st moving picture data, . . . , 2nd moving picture data," and "8th moving picture data, 8th moving picture data, . . . , 1st moving picture data."

Series of moving picture data of 1024 sets have approximately the same video content, though different in minute portions. Each DVD player is conditioned in advance so as to play back a different set of moving picture data series from Sequence Key Sections. Thus, when the content of the moving picture data including the Sequence Key Sections is illegally copied and played back, the played-back moving picture appears to be different in a minute portion from the picture expected to be played back from the above mentioned 1024 sets, so as to indicate that the content is illegally copied. Further, if the played-back moving picture appears to be the same as the moving picture expected to be played back from the above mentioned 1024 sets other than in the minute portions where 1024 sets should appear to be different from each other, it can be determined that the pertinent data is illegally copied by a DVD player to which the pertinent data combination is assigned to. Thus, a device on which the illegal copying is performed can be tracked down, and the distribution of the pirate DVDs can be prevented.

The DVD player according to the first embodiment realizes the Sequence Key technique as described above in a player that plays back the content of the DVD media capable of handling the HD-DVD Video.

Figure 3:
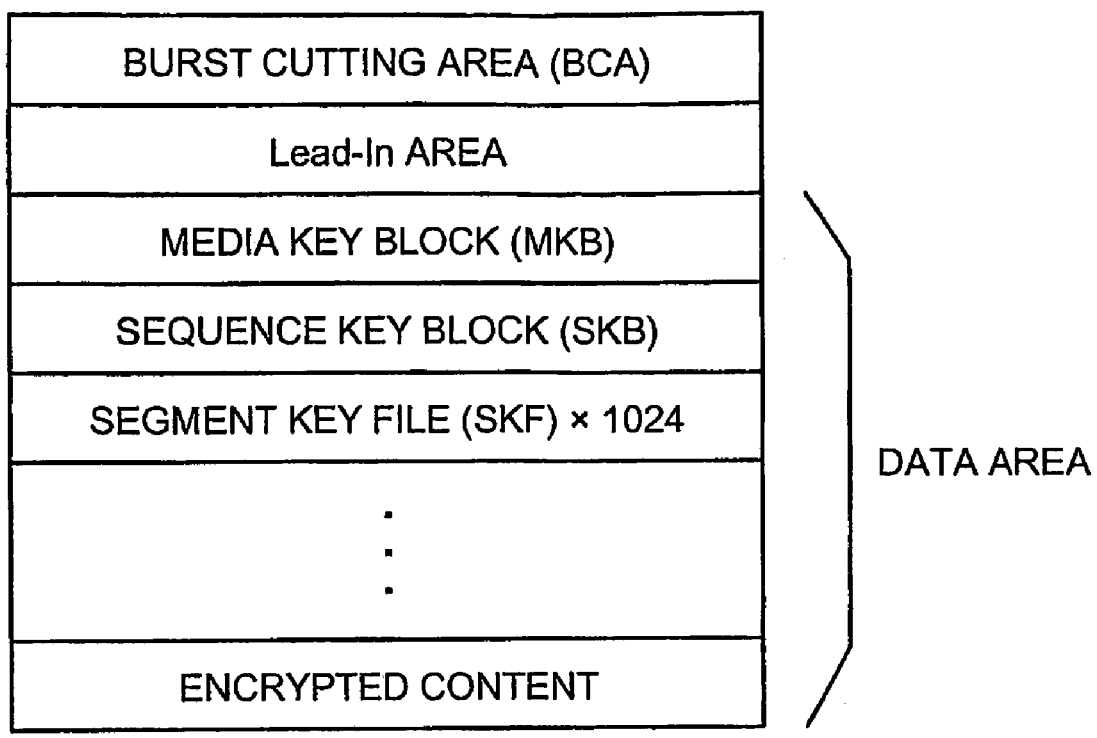
FIG. 3 is a schematic diagram of a physical data structure of a DVD media with an HD-DVD Video format.

FIG. 3 is a diagram of a physical data structure of the DVD media in HD-DVD Video format. As shown in FIG. 3, the DVD media of HD-DVD Video format has a Burst Cutting Area (BCA), a Lead-in Area, and a Data Area, provided in this order from an innermost periphery. In FIG. 3, only a portion related with the first embodiment is shown.

In the Data Area, a Media Key Block (MKB), a Sequence Key Block (SKB), and 1024 Segment Key Files (SKFs) are stored.

The MKB is an updatable collection of Media Keys corresponding to a legitimate DVD player. In the SKB, information for selecting a Segment Key File is recorded for each DVD player.

The SKF defines a series of moving picture data sets in the Sequence Key Section, and there are 1024 SKFs corresponding to the 1024 sets of data. In the SKF, Segment Key Entries are registered for each Sequence Key Section. The Segment Key Entry associates a Segment Number (SEG_NO) that uniquely identifies moving picture data to be processed among eight pieces of moving picture data in the Sequence Key Section with an encrypted Segment Key (E_SEG_KEY) that serves to decrypt encrypted moving picture data designated by the corresponding Segment Number.

Figure 4:
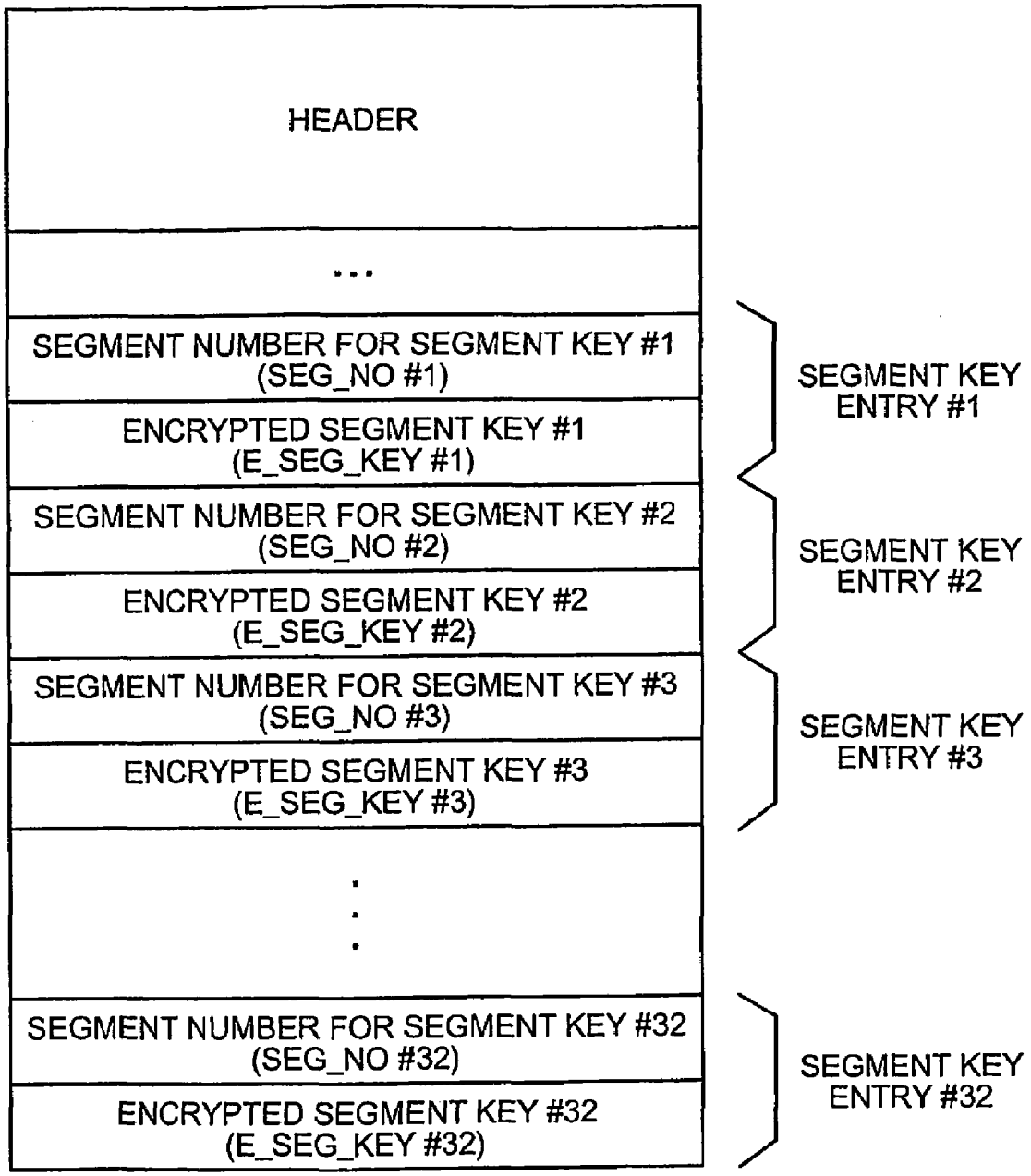
FIG. 4 is a schematic diagram of a data structure of a Segment Key File (SKF)

FIG. 4 is a diagram of a data structure of the SKF. As shown in FIG. 4, the SKF includes a header followed by 32 Segment Key Entries corresponding to the Sequence Key Sections, and each of the Segment Key Entries contains a pair of a Segment Number #n and an encrypted Segment Key #n.

When the SKF contains the Segment Number #n=m, the data indicates playback of the m-th piece of moving picture data in the n-th Sequence Key Section. The encrypted Segment Key is, as described later, decrypted by a Volume Unique Key by the decrypting unit 102 and registered in the SKT in the storage unit 108 together with the corresponding Segment Number.

FIG. 5A is a schematic diagram of a data structure of the SKT, and FIG. 5B shows an example of the SKT. As shown in FIG. 5A, in the SKT, 32 sets of Segment Number #n (SEG_NO #n) and corresponding decrypted Segment Key #n (SEG_KEY #n) are registered. The Segment Key (SEG_KEY #n) is used at decryption of moving picture data designated by the corresponding Segment Number (SEG_NO #n).

An address in the SKT is designated by a Segment Key Pointer used at selection of moving picture data to be played back. Specifically, the moving picture data selecting unit 105 looks up an address designated by the Segment Key Pointer, acquires an entry of a pair of Segment Number #n and Segment Key #n from the SKT, and selects moving picture data to be played back from the Sequence Key Section.

Further, in a table shown in FIG. 5B, an example of the SKT for the Sequence Key Sections of FIG. 2 is shown. As can be seen from the example of FIG. 5B, the set of "1st moving picture data, 6th moving picture data, ..., 8th moving picture data" among sets of moving picture data series shown in FIG. 2, is registered corresponding to the respective Segment Numbers (SEG_NO).

Next, an overview of DVD Video data to be played back in the DVD player according to the first embodiment will be described. The DVD Video data is made up of a Video Manager (VMG) and one or more Video Title Sets (VTSs) for each title. The VMG is composed of control information for the entire DVD and contents for a menu screen that is output first on the DVD playback. The HD-DVD Video has two VTS standards, i.e., a Standard VTS and an Advanced VTS. The Standard VTS corresponds to standard contents such as video content, audio content, and sub picture content.

The Advanced VTS corresponds to video content, audio content, sub picture content, and further to an Advanced content such as archive content, a XML file, and an open font file.

In the Standard VTS, moving picture related information is stored in a cell, whereas in the Advanced VTS, moving picture related information is stored in a TMAP. In the first embodiment, only the Standard VTS contains the Sequence Key Section for the implementation of the Sequence Key function.

Figure 6:
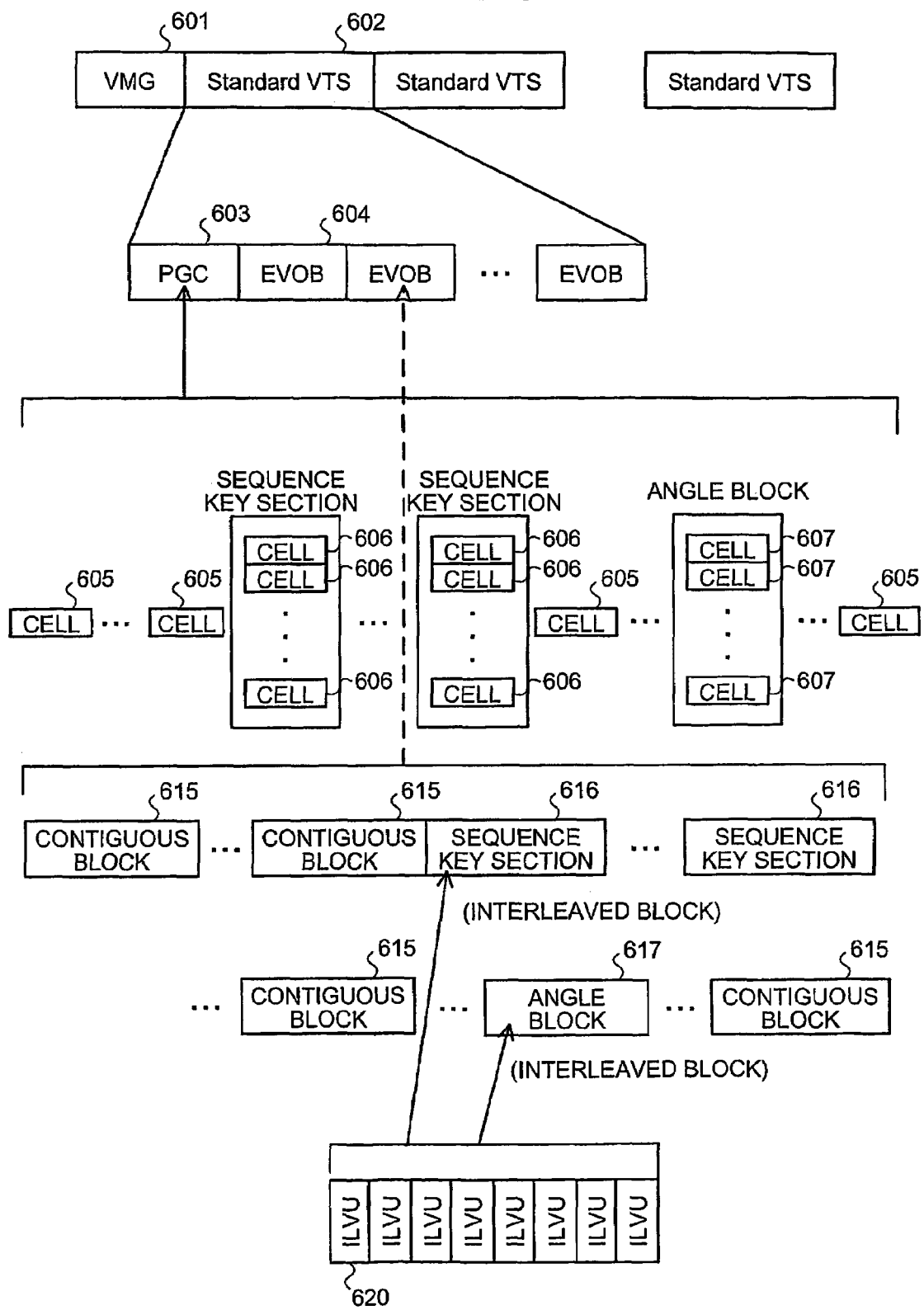
FIG. 6 is a diagram of a schematic structure of a DVD Video data.

FIG. 6 is a schematic diagram of a structure of DVD Video data. Since the first embodiment deals only with the Standard VTS, a VMG 601 and plural Standard VTSs 602 are shown in FIG. 6.

The Standard VTS 602 is made up of one PGC (Program Chain) 603 and plural EVOBs 604. The PGC 603 determines an order of playback of cells during operation. The EVOB 604 is made up of plural Enhanced Vide Object Block Units (EVOBUs) (not shown) and includes encrypted moving picture data such as the above-described video content.

FIG. 6 shows areas where the content is stored in the EVOB 604. The content can be stored in a contiguous block 615 which is not divided into segments, and an interleaved block made up of eight interleaved units (ILVUs) 620 of a predetermined size as a content unit. As shown in FIG. 6, a Sequence Key Section 616 and an Angle Block 617 are interleaved blocks. Here, the Angle Block 617 is a block that stores moving picture data of a video segment that is shot from more than one angle, and each ILVU 620 stores data of the video segment shot from one angle.

On the other hand, each Sequence Key Section 616 stores moving picture data corresponding to the respective Segment Numbers #n=1 to 8 described above in the ILVUs 620. Thus, in the first embodiment, the data structure of the Sequence Key Section 616 is realized with the ILVU 620 similarly to the conventionally incorporated Angle Block 617. Hence, the Sequence Key function of the DVD player according to the first embodiment can be developed based on the Angle function, and an efficient incorporation of the Sequence Key technique into the conventional DVD player is allowed.

Cells included in the PGC 603 correspond to contents in the contiguous block 615, the Sequence Key Section 616, and the Angle Block 617 in the EVOB 604. A cell 605 corresponds to the content of the contiguous block 615, a cell 606 corresponds to the content of each ILVU 620 in the Sequence Key Section 616, and a cell 607 corresponds to the content of each ILVU 620 in the Angle Block 617.

Figure 7:
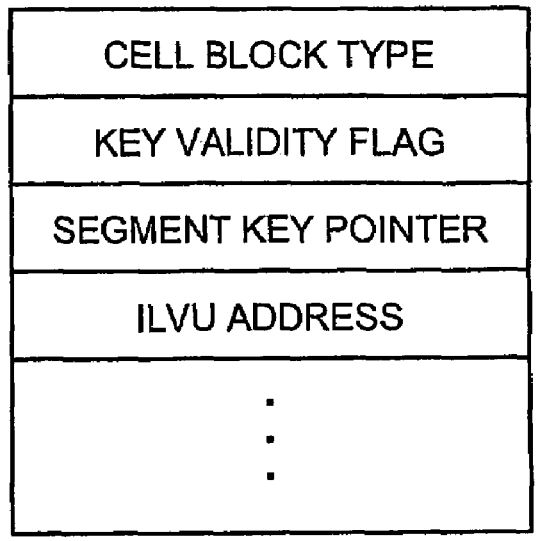
FIG. 7 is a diagram of a data structure of a cell.

FIG. 7 is a diagram of a data structure of a cell. In FIG. 7, only fields related with the Sequence Key function according to the first embodiment are shown. Various fields are provided in the cell for the control of playback from the ILVU in each Sequence Key Section. The cell includes, for example, fields for a Cell Block Type, a Key Validity Flag, a Segment Key Pointer, and an ILVU address.

The Cell Block Type field is a field where a block type of a cell is defined. Specifically, a value indicating one of "Sequence Key Section," "Angle Block," and "contiguous block" is set in the Cell Block Type field. Based on the Cell Block Type, it can be confirmed which type, i.e., which of the Sequence Key Section, the Angle Block, and the contiguous block, the pertinent cell is.

The Key Validity Flag indicates whether the use of the key is valid or not. Specifically, a value indicating one of "Segment Key," "Title Key," and "invalidity" is set. Based on the Key Validity Flag, it can be determined whether to use the Segment Key, the Title Key, or none of the keys (when the key is "invalid").

The Segment Key Pointer field is a field where an address of the Segment Key registered in the Segment Key Table is set when the Key Validity Flag is set to the "Segment Key."

When the moving picture data selecting unit 105 selects the content designated by the Segment Number from the Sequence Key Section, values set in the fields of a first cell of the Sequence Key Section are looked up to.

The ILVU address field is a field where a header address of the ILVU in which moving picture data corresponding to the cell is stored.

Figure 8:
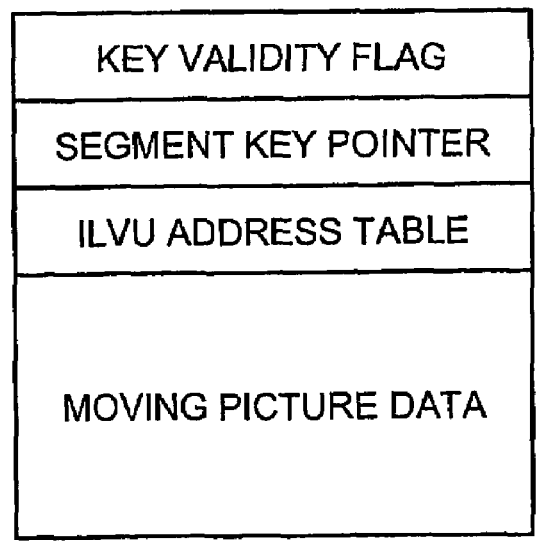
FIG. 8 is a diagram of a data structure of an Interleaved Unit (ILVU)

FIG. 8 is a diagram of a data structure of the ILVU. In FIG. 7, only the fields related with the Sequence Key function according to the first embodiment are shown. The ILVU, as shown in FIG. 8, includes respective fields for a Key Validity Flag, a Segment Key Pointer, and an ILVU address table, and moving picture data.

In the Key Validity Flag field, and the Segment Key Pointer field, the same values as in respective fields of the cell are set.

After the playback of moving picture data of the ILVU in the Sequence Key Section, the DVD player proceeds to the processing of the ILVU in the next Sequence Key Section. The ILVU address table field is a field where a header address of the ILVU address table, in which an address and a size of the next ILVU to be processed are stored, is set.

FIG. 9A is a diagram of a data structure of the ILVU address table, and FIG. 9A shows an example of the ILVU address table. The ILVU address table, as shown in FIG. 9A, has a field for SEQ_Cn_DSTA, where the character "n" corresponds to the Segment Number (SEG_NO). When the Segment Number is k (SEG_NO=k), an address and a size of the next ILVU to be processed are set in the field of SEQ_Ck_DSTA, whereas "0x7FFFFFFFFFFF" representing invalidity is set in other fields. In FIG. 9B, an example is shown where the Segment Number is two (SEG_NO=2). Here, an address and a size of the next ILVU to be processed is set only in the field of SEQ_C2_DSTA, and a value indicating invalidity (0x7FFFFFFFFFFF) is set in all other fields. Hence, information on a transition target is set in a single field SEQ_Ck_DSTA so that the transition does not occur to other ILVUs which are not designated.

On the other hand, in the case of ILVU of the Angle Block, an address of the next ILVU to be processed is set in all the fields. In addition, in the case of the Angle Block, the Segment Number of the next ILVU to be processed is acquired in reference to a system parameter. A table where all addresses of the ILVUs which can be processed next are set is referred to, an address of the next ILVU corresponding to the acquired Segment Number is acquired, and the process transits to the ILVU of the acquired address for the playback of the moving picture data.

The setting is made different for the Sequence Key Section from that in the Angle Block for the following reason. During the playback of the moving picture data in the ILVU of the Angle Block, the user might instruct to switch to other angle. Hence, the addresses of the possible next ILVUs are set in the address table to indicate the ILVUs of all Angle Numbers, so that the address of any angles possibly designated by the user can be known in reference to the system parameter when the user switches the angle.

In the case of the Sequence Key Section, however, the previously set moving picture data needs to be played back in sequence at any time, and the order is not switched so as to cause moving picture data of a different Segment Number be played back instead. Hence, in the Sequence Key Section, an address and a size of the next ILVU are set only in the field corresponding to the current Segment Number. In addition, the next ILVU address can be acquired without reference to the system parameter.

Figure 10:
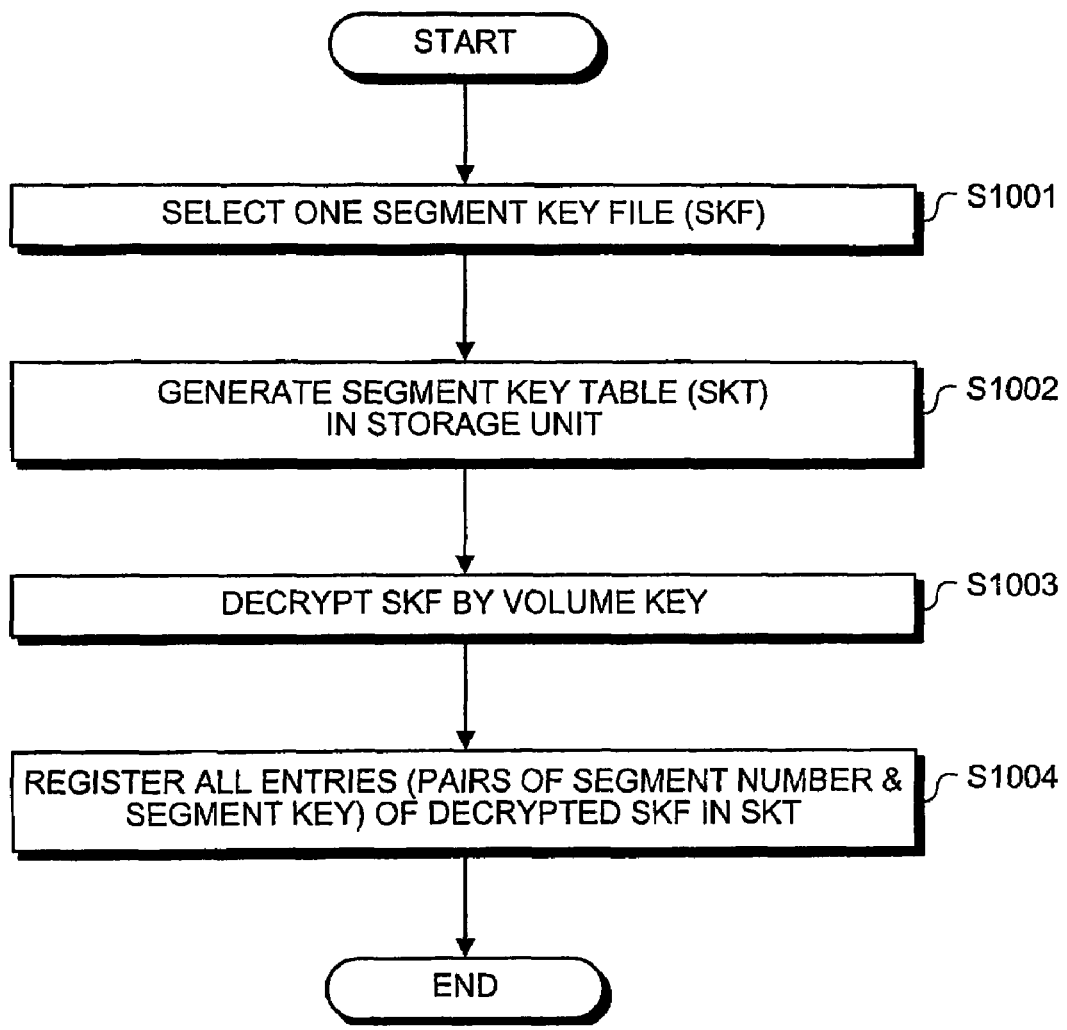
FIG. 10 is a flowchart of a process sequence of extraction of a Segment Key according to the first embodiment.

Next, a process of content playback by the DVD player according to the first embodiment with the above-described structure will be described. First, a process of extraction of the Segment Key recorded on the DVD media will be described. FIG. 10 is a flowchart of a process sequence of the Segment Key extraction according to the first embodiment.

The presentation manager 100 selects one Segment Key File (SKF) from 1024 SKFs by the SKF selecting unit (step S1001).

Then, the decrypting unit 102 generates the Segment Key Table (SKT) 109 for storing each Key Entry which is a decrypted version of the selected SKF in the storage unit 108 (step S1002). The decrypting unit 102 decrypts the SKF selected by the SKF selecting unit 101 by a Volume Unique Key (step S1003). Thus, the encrypted SKF of each Segment Key Entry is decrypted. The decrypting unit 102 registers all Segment Key Entries of the decrypted SKFs, i.e., 32 pairs of Segment Numbers and Segment Keys in the SKT 109 generated in the storage unit 108 (step S1004).

Figure 11:
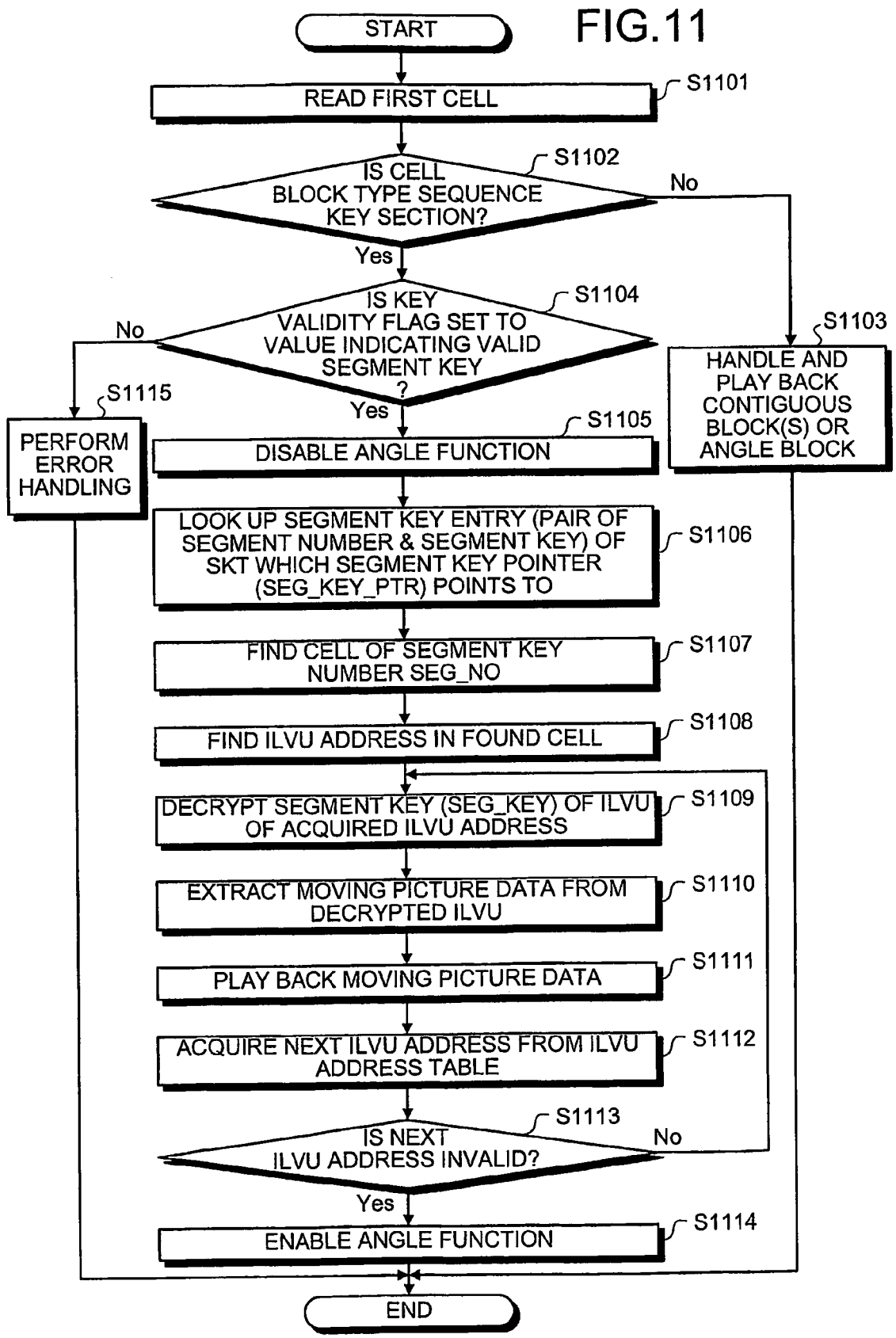
FIG. 11 is a flowchart of a process sequence of playback of moving picture data in Sequence Key Sections according to the first embodiment.
Figure 12:
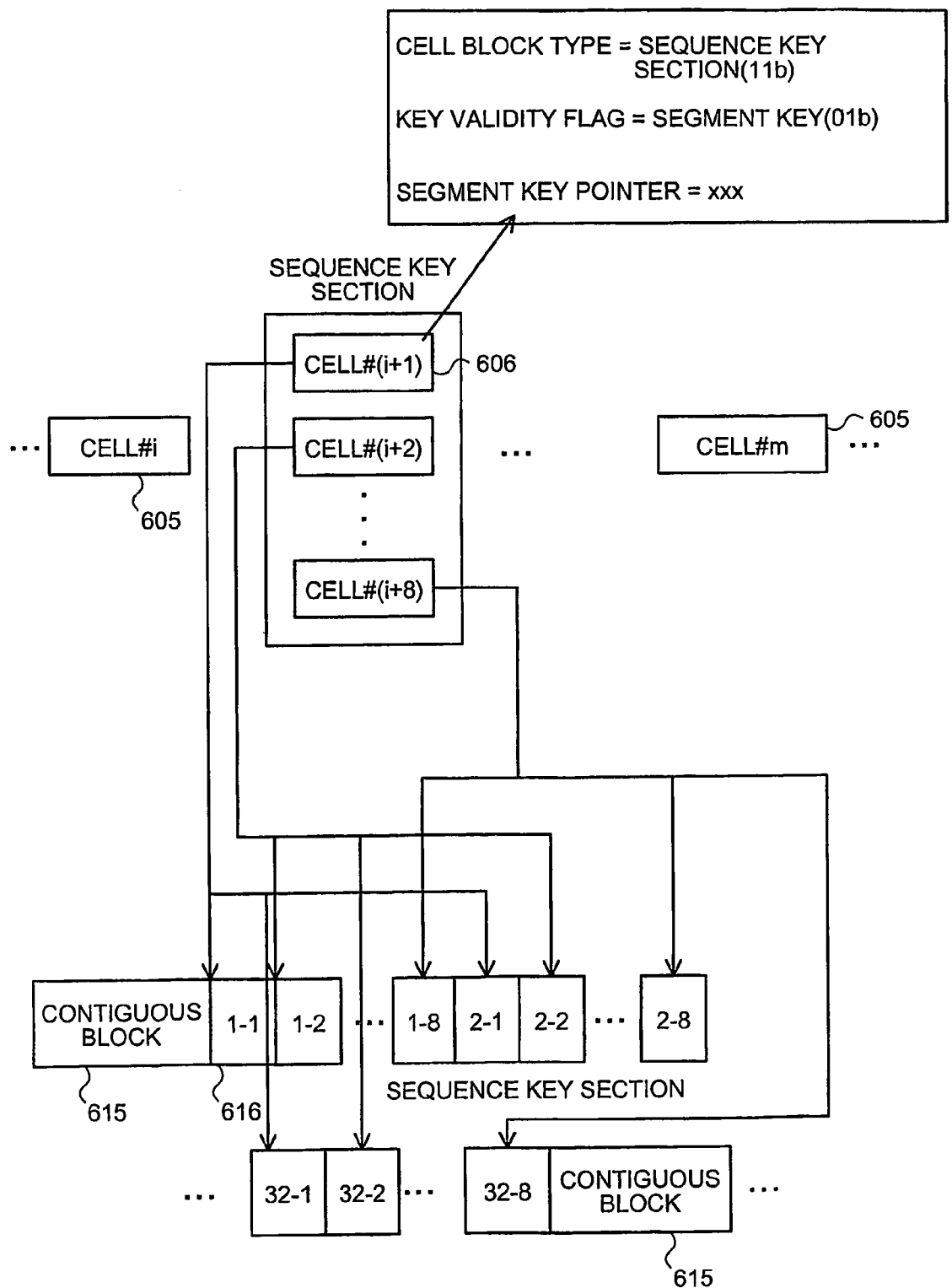
FIG. 12 is a diagram of correspondence between a cell 606 and an ILUV 616 in the playback of moving picture data in the Sequence Key Sections.

Next, a process of playback of moving picture data in the Sequence Key Section will be described. FIG. 11 is a flowchart of a process sequence of the playback of moving picture data in the Sequence Key Section according to the first embodiment. FIG. 12 is a diagram illustrating a correspondence between the cell 606 and the ILVU 616 at the playback of moving picture data in the Sequence Key Section.

First, the moving picture related information reading unit 103 reads out the DVD Video data from the DVD media, and the read-out DVD Video data is sequentially supplied in a form of a cell. When the data input proceeds up to the interleaved block, a first cell in the interleaved block is read out (step S1101). Then, the moving picture related information reading unit 103 refers to the Cell Block Type of the read-out first cell and checks whether the Cell Block Type is set to a value indicating the Sequence Key Section or not (step S1102).

When the moving picture related information reading unit 103 determines that the Cell Block Type is set to a value other than the Sequence Key Section (No in step S1102), the moving picture related information reading unit 103 determines that the pertinent cell is a cell in a contiguous block or an Angle Block, and performs processing for the pertinent block and plays back moving picture data (step S1103).

On the other hand when the moving picture related information reading unit 103 determines that the Cell Block Type is set to the value of the Sequence Key Section in step S1102

(Yes in step S1102), the moving picture related information reading unit 103 looks up to a content of the Key Validity Flag of the first cell to check whether the Key Validity Flag is set to the value indicating a valid Segment Key or not (step S1104). When the moving picture related information reading unit 103 determines that the Key Validity Flag is not set to the value indicating the valid Segment Key (No in step S1104), the moving picture related information reading unit 103 performs an error handling (step S1115).

On the other hand, when the moving picture related information reading unit 103 determines that the Key Validity Flag is set to the value indicating the valid Segment Key (Yes in step S1104), the moving picture related information reading unit 103 disables the Angle function (step S1105).

Then, the moving picture related information reading unit 103 looks up to the Segment Key Pointer (SEG_KEY_PTR) of the first cell and delivers the value set in the Segment Key Pointer field to the moving picture data selecting unit 105. The moving picture data selecting unit 105 reads out the Segment Key Entry, i.e., the Segment Number (SEG_NO) and the Segment Key (SEG_KEY) designated by the received Segment Key Pointer (SEG_KEY_PTR) from the SKT 109 (step S1106).

The moving picture data selecting unit 105 moves to a (SEG_NO)-th cell, i.e., a cell of the read-out Segment Number (SEG_NO) in the Sequence Key Section (step S1107) to acquire the ILVU address of the cell (step S1108). Then, the moving picture data selecting unit 105 acquires the ILVU from the acquired ILVU address to deliver the same to the moving picture data decrypting unit 106. Thus, the (SEG_NO)-th ILUV in the Sequence Key Section, i.e., the ILVU corresponding to the pertinent Segment Number is selected.

The moving picture data decrypting unit 106, then, acquires the Segment Key corresponding to the Segment Number read out by the moving picture related information reading unit 103, to decrypt the ILVU acquired by the moving picture data selecting unit 105 by the acquired Segment Key (step S1109). The moving picture data decrypting unit 106 extracts the moving picture data from the decrypted ILVU (step S1110) to deliver the same to the decoder 107. The decoder 107 plays back the moving picture data extracted from the ILVU (step S1111). Thus, the moving picture data corresponding to the Segment Number, i.e., the moving picture data in the (SEG_NO)-th ILVU in the Sequence Key Section is played back.

Then, the moving picture data selecting unit 105 refers to the ILVU address table of the current cell to acquire the address of the ILVU to be processed next in the next Sequence Key Section (Step S1112). Then, the moving picture data selecting unit 105 checks whether the address is set to the value indicating invalidity or not (step S1113), and on determining that the address is not set to the value indicating invalidity (No in step S1113), repeats the process from step S1109 to S1112 for the playback of moving picture data in the next ILVU. Thus, the series of moving picture data in the Sequence Key Sections are sequentially played back corresponding to the DVD player. In the example shown in FIG. 2, the moving picture data should be played back in the order of ILVU(1-1), ILVU(2-6), . . . , ILVU(32-8) as can be seen from FIG. 12.

On the other hand, when the moving picture data selecting unit 105 determines that the address of the acquired next ILVU is set to the value indicating invalidity (Yes in step S1113) in step S1113, the moving picture data selecting unit 105 determines that playback of moving picture data of all Sequence Key Sections has been completed, and enables the Angle function (step S1114) and ends the playback of the Sequence Key Sections.

Thus, according to the first embodiment, in the Standard VTS of the DVD media for the HD-DVD Video, the EVOB which includes plural Sequence Key Sections that are groups of contents formed from encrypted pieces of moving picture data including different minute portions, and the Key Entries which associates the Segment Number that uniquely identifies moving picture data to be played back among the plural pieces of moving picture data in the Sequence Key Sections with the Segment Key, are registered for each Sequence Key Section. At the playback of moving picture data from the Sequence Key section, one Segment Key File among 1024 SKFs is selected, a series of ILVUs corresponding to a series of Segment Numbers registered in the selected SKF is selected, and moving picture data in the selected series of ILVUs is decrypted and played back by the Segment Keys corresponding to respective Segment Numbers. Hence, even when the content of the DVD media or the moving picture data is illegally copied, an apparatus used for the illegal copying can be identified based on the presence/absence of the difference between the played-back contents and the series of contents corresponding to the apparatus, and the distribution of the pirate recording medium such as DVDs can be prevented. Thus, the Sequence Key technique can be realized with good affinity.

Further, in the DVD player according to the first embodiment, the Sequence Key Section is formed from an interleaved block using the ILVU. Hence, the structure of implementation is similar to the structure of Angle switching, whereby the Sequence Key technique can be efficiently realized with the use of the structure of the conventional Angle function.

The DVD player according to the first embodiment implements the Sequence Key technique by providing Sequence Key Sections for the contents of Standard VTS. A DVD player according to a second embodiment further implements the Sequence Key technique for the contents of the Advanced VTS for the HD-DVD Video.

A structure of the DVD player according to the second embodiment is similar to the structure of the DVD player according to the first embodiment shown in FIG. 1. Dissimilar to the first embodiment, the DVD player according to the second embodiment looks up to the TMAP instead of the cell as the moving picture related information when the Sequence Key Section is provided for the Advanced VTS. The TMAP stores control information for the playback of the Advanced VTS, and is made up of one or more TAMPIs.

Figure 13:
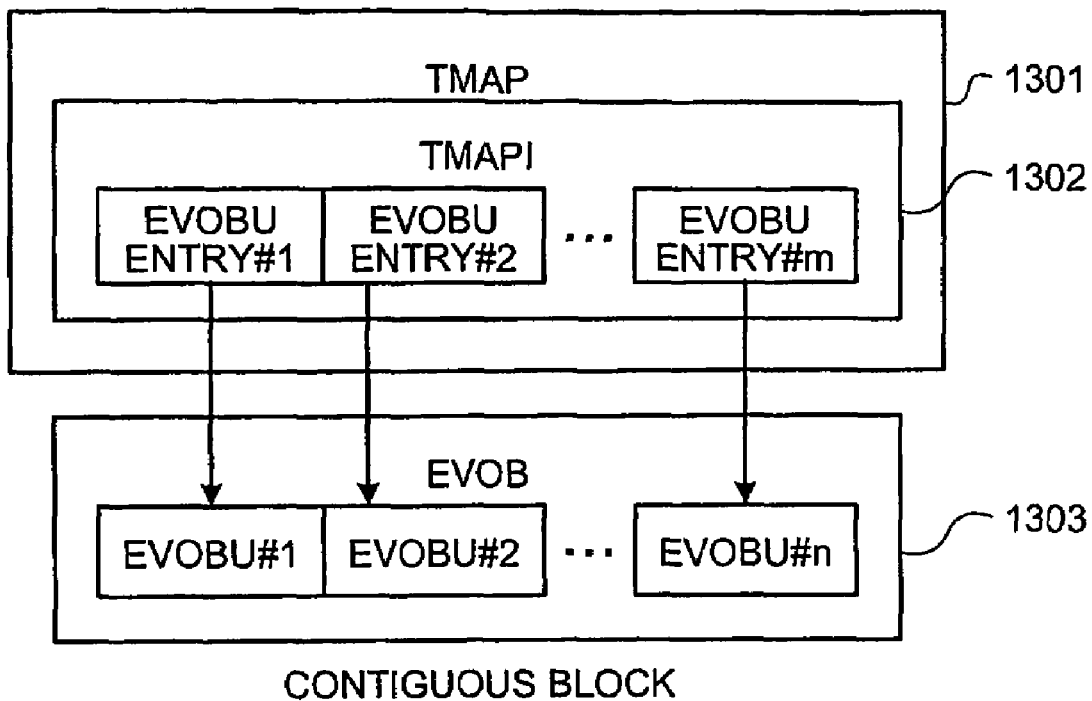
FIG. 13 is a diagram of an example of an Advanced VTS data structure where a TMAP is formed from a single TMAPI.

FIG. 13 is a diagram of an example of a data structure where TMAP is formed from only one TMAPI for the Advanced VTS. In TMAPI, an entry of the EVOBU is registered. When TMAP is formed from only one TMAPI, the EVOB is formed as a contiguous block as shown in FIG. 13.

Figure 14:
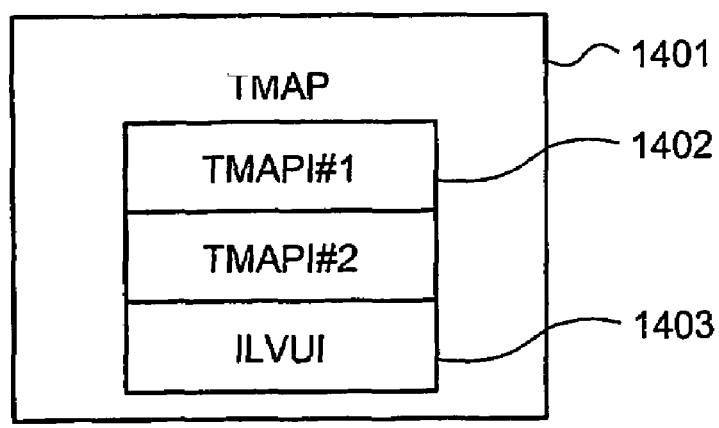
FIG. 14 is a diagram of an example of the Advanced VTS data structure where a TMAP is formed from plural TMAPIs.

FIG. 14 is a diagram of an example of a data structure where the TMAP is formed from plural TMAPIs for the Advanced VTS. As shown in FIG. 14, the TMAP is formed from plural TMAPIs and an ILVUI. In the ILVUI, an entry of the ILVU is registered.

Figure 15:
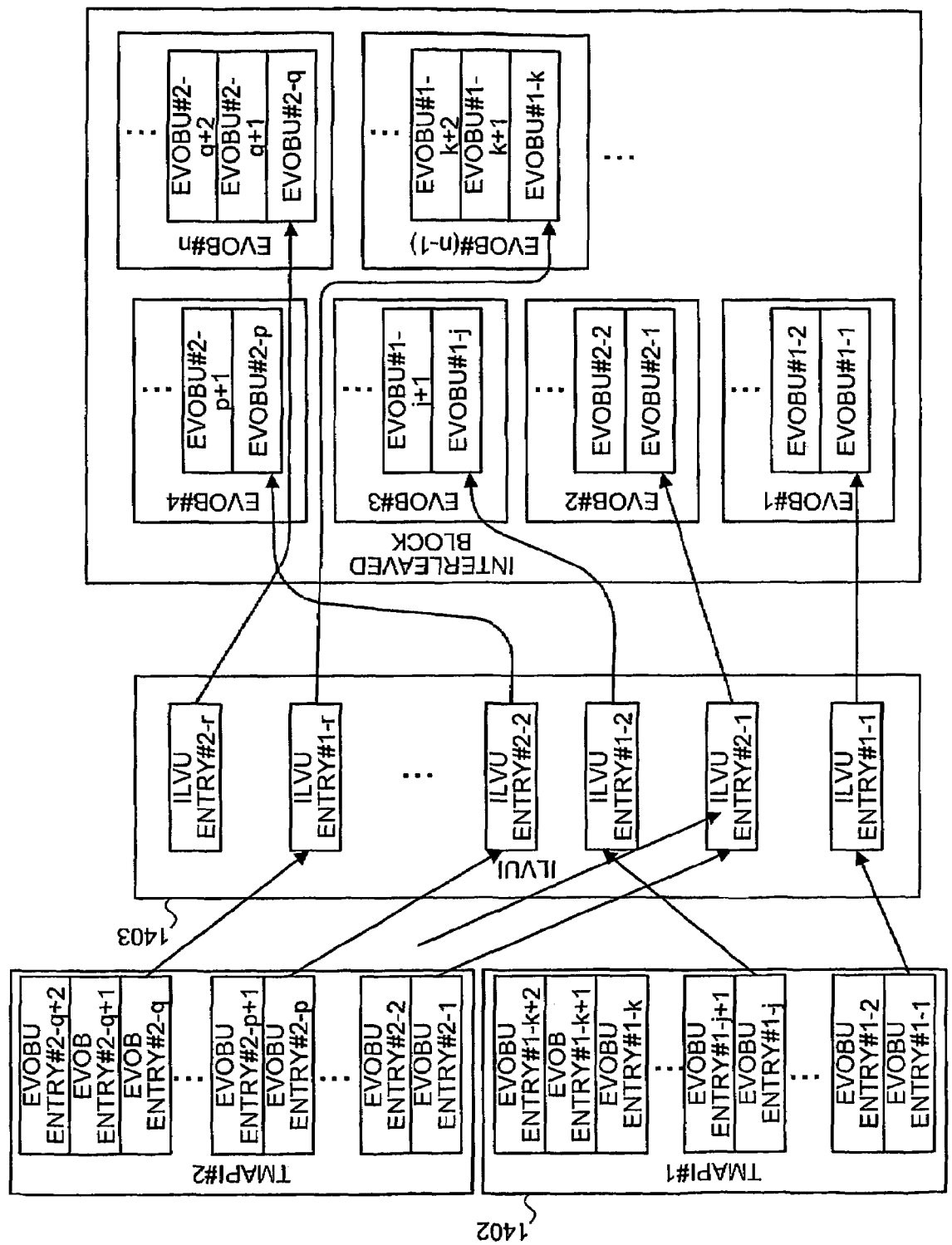
FIG. 15 is a diagram of an example of a data structure of TMAPIs, ILVUI, and Enhanced Video Object Blocks (EVOBs), where plural TMAPIs form a TMAP.

FIG. 15 is a diagram of an example of a data structure of the TMAPIs, the ILVUI, and the EVOBs where the plural TMAPIs make up the TMAP. As shown in FIG. 15, when the TMAP is formed from the plural TMAPIs, the EVOB is formed as an interleaved block. In the second embodiment, the Sequence Key Section is formed as the interleaved block as shown in FIG. 15.

Figure 16:
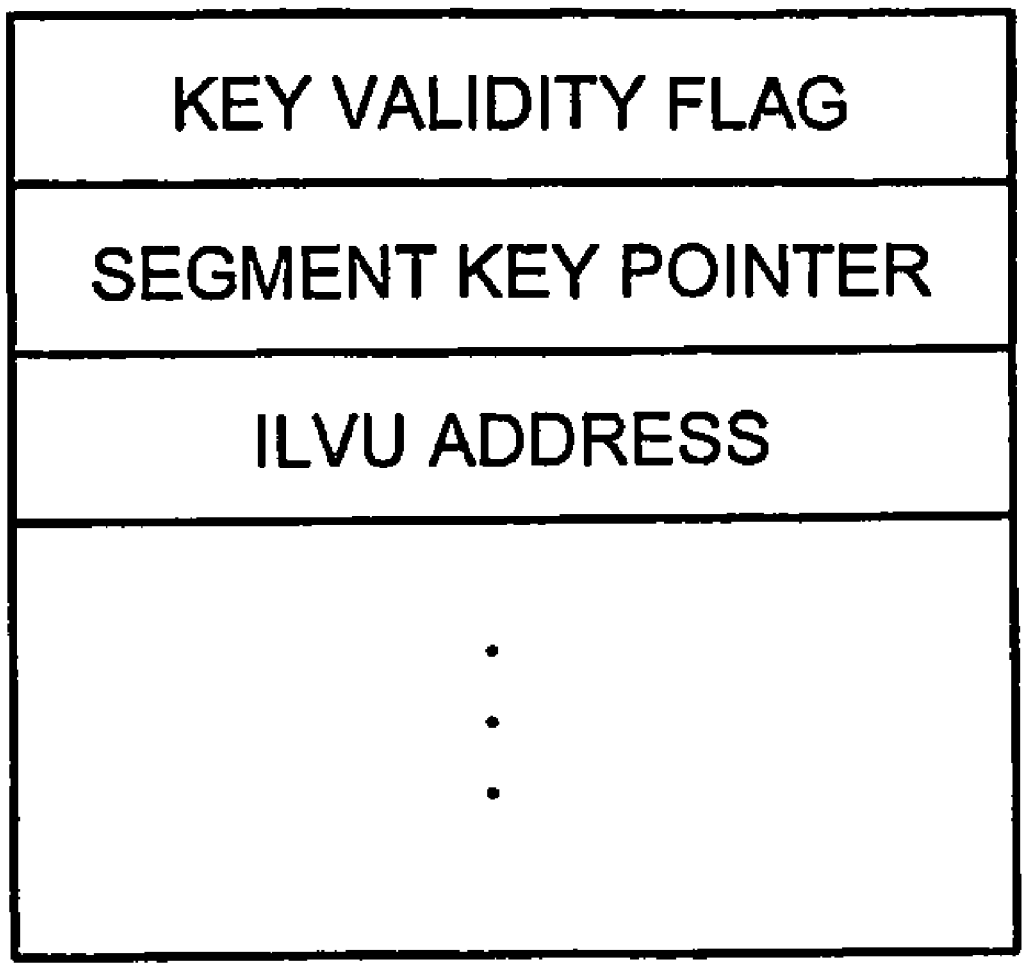
FIG. 16 is a diagram of a data structure of a TMAPI.

FIG. 16 is a diagram of a data structure of the TMAPI. In FIG. 16, fields related with the Sequence Key function according to the second embodiment are specifically shown. In the TMAP, fields for performing the playback control of the ILVU in each Sequence Key Section is provided, i.e., fields for the Key Validity Flag, the Segment Key Pointer, and the ILVU address are provided. The content and the function of the respective fields are the same as those of the Key Validity Flag, the Segment Key Pointer, and the ILVU address of the cell according to the first embodiment.

Next, the process of playback of moving picture data of the Sequence Key Sections will be described. Here, the extraction of the Segment Key is performed in a same manner with the first embodiment. FIG. 17 is a flowchart of a process sequence of the playback of moving picture data from the Sequence Key Section according to the second embodiment.

First, the moving picture related information reading unit 103 reads out the DVD Video data from the DVD media and sequentially supplies the TMAP of the read-out data. When the process reaches the interleaved block, the moving picture related information reading unit 103 reads out the first TMAP of the interleaved block (step S1701). Then, the moving picture related information reading unit 103 looks up the content of the Key Validity Flag of the first TMAP and checks whether the Key Validity Flag is set to the value indicating valid Segment Key (step S1702). When the moving picture related information reading unit 103 determines that the Key Validity Flag is not set to the value indicating the valid Segment Key (No in step S1702), the moving picture related information reading unit 103 performs an error handling (step S1713).

On the other hand, when the moving picture related information reading unit 103 determines that the Key Validity Flag is set to the value indicating the valid Segment Key in step S1702 (Yes in step S1702), the moving picture related information reading unit 103 disables the Angle function (step S1703).

Then, the moving picture related information reading unit 103 looks up the Segment Key Pointer (SEG_KEY_PTR) of the first TMAP and delivers the value of the Segment Key Pointer to the moving picture data selecting unit 105. The moving picture data selecting unit 105 reads the Segment Key Entry, i.e., the Segment Number (SEG_NO) and the Segment Key (SEG_KEY) pointed by the received Segment Key Pointer (SEG_KEY_PTR) in the Segment Key Table (SKT) 109 (step S1704).

Then, the moving picture data selecting unit 105 jumps to a TMAP of the read-out Segment Number, i.e., (SEG_NO)-th TMAP in the Sequence Key Section (step S1705), and acquires the ILVU address from the TMAP (Step S1706). Then the moving picture data selecting unit 105 acquires the ILVU based on the acquired ILVU address and delivers the same to the moving picture data decrypting unit 106. Thus, the ILVU corresponding to the Segment Number, i.e., the (SEG_NO)-th ILVU in the Sequence Key Section is selected.

Then, the moving picture data decrypting unit 106 acquires the Segment Key corresponding to the Segment Number read out by the moving picture related information reading unit 103, and decrypts the ILVU acquired by the moving picture data selecting unit 105 by the acquired Segment Key (step S1707). Then, the moving picture data decrypting unit 106 extracts the moving picture data from the decrypted ILVU (step S1708), and decoder 107 plays back the moving picture data extracted from the ILVU (step S1709). Thus, the moving picture data in the (SEG_NO)-th ILUV in the Sequence Key Section is played back.

Then, the moving picture data selecting unit 105 looks up the ILVU address table of the current TMAP to acquire the address of the next ILVU to be processed in the next Sequence Key Section (step S1710). Then, the moving picture data selecting unit 105 checks whether the address is set to the value indicating invalidity or not (step S1711), and on determining that the address is not set to the value indicating invalidity (No in step S1711), repeats the process from step S1707 to S1710 for the playback of moving picture data in the next ILVU. Thus, a series of moving picture data in the Sequence Key Section is sequentially played back corresponding to the DVD player.

On the other hand, when the moving picture data selecting unit 103 determines that the address of the acquired next ILVU is set to the value indicating invalidity in step S1711 (Yes in step S1711), the moving picture data selecting unit 103 determines that playback of moving picture data from all Sequence Key Sections has been completed, and disables the Angle function (step S1712) to end the playback of the Sequence Key Section.

Thus, in the second embodiment, for the Advanced VTS of the DVD media for the HD-DVD Video, the EVOB which includes plural Sequence Key Sections that are groups of contents formed from plural pieces of encrypted moving picture data with different minute portions, and Key Entries which associate the Segment Number that uniquely identifies moving picture data to be played back among plural pieces of moving picture data in the Sequence Key Sections with the Segment Key are registered for each Sequence Key Section. At the playback of the moving picture data in the Sequence Key Section, one Segment Key File is selected from 1024 SKFs, and a series of ILVUs corresponding to a series of Segment Numbers registered in the selected Segment Key File is selected, and the moving picture data in the selected series of ILVU is decrypted and played back by the Segment Keys corresponding to the respective Segment Numbers. Thus, even when the contents of the DVD media or the moving picture data is illegally copied, an apparatus used for illegal copying can be identified according to the presence/absence of the difference between the played-back content and the series of contents corresponding to the apparatus, for the prevention of the distribution of the pirate recording medium such as DVD. Thus, the Sequence Key technique can be realized with a high affinity.

In addition, in the DVD player according to the second embodiment, the Sequence Key Section is formed from the interleaved block with the ILVU. Hence the structure of implementation is similar to the structure of Angle switching, whereby the Sequence Key technique can be efficiently implemented with the use of the structure of the conventional Angle function.

Here, the computer program for content playback to be executed in the DVD players according to the first and the second embodiments is embedded in advance in a medium such as a read only memory (ROM) for provision.

The computer program for content playback to be executed in the DVD players according to the first and the second embodiments may be recorded in a computer readable recording medium such as a CD-ROM, a flexible disk (FD), a compact disc recordable (CD-R), or a DVD in an installable or an executable format file for provision.

Further, the computer program for content playback to be executed in the DVD players according to the first and the second embodiments may be stored in a computer which is connected to a network such as the Internet and downloaded via the network for provision. Still further, the computer program for content playback to be executed in the DVD players according to the first and the second embodiment may be provided or distributed via a network such as the Internet.

The computer program for content playback to be executed in the DVD players according to the first and the second embodiments has a module structure including the SKF selecting unit 101, the moving picture related information reading unit 103, the EVOB reading unit 104, the moving picture data selecting unit 105, and the moving picture data decrypting unit 106 as described above. As an actual hardware, a central processing unit (CPU; processor) reads out and executes the computer program for content playback from the ROM to load the above-described respective units on a main memory so as to generate the SKF selecting unit 101, the moving picture related information reading unit 103, the EVOB reading unit 104, the moving picture data selecting unit 105, and the moving picture data decrypting unit 106 on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A content playback apparatus comprising:
   a segment key file selecting unit that selects one segment key file from plural segment key files at playback of content from a sequence key section in a recording medium, the recording medium storing a video object which has n sequence key sections and the segment key files, each sequence key section being groups of contents formed from m pieces of encrypted contents with different minute portions, each segment key file registering n key entries corresponding to each sequence key section, each key entry associating segment identification information that uniquely identifies a content to be played back among the m contents in the sequence key section with a segment key that is used for decrypting a content corresponding to the segment identification information, n and m being natural numbers;
   a content selecting unit that selects each content corresponding to the segment identification information of the n key entries registered in the selected segment key file;
   a content decrypting unit that decrypts each selected content by a segment key corresponding to the segment identification information of each selected content; and
   a playback unit that plays back each decrypted content.

2. The content playback apparatus according to claim 1, wherein
   the segment key file is recorded in the recording medium in an encrypted form encrypted by a predetermined encryption key,
   the segment key file selecting unit further decrypts the selected single segment key file with the encryption key, and registers all the key entries registered in the decrypted segment key file in a segment key table, and
   the content selecting unit selects respective contents corresponding to the series of segment identification information of respective key entries in the decrypted segment key file.

3. The content playback apparatus according to claim 2, further comprising a storage unit that stores the segment key table in which the key entries of the decrypted segment key files are stored,
   wherein the segment key file selecting unit further registers all the key entries registered in the decrypted segment key file in the segment key table, and
   the content selecting unit selects the respective contents corresponding to the series of segment identification information of the key entries registered in the segment key table.

4. The content playback apparatus according to claim 1, wherein the recording medium further stores content related information which includes a key pointer that indicates an address of the key entry and further includes control information for playback of respective contents of the sequence key section,
   the content playback apparatus further comprises a related information reading unit that reads out the content related information from the recording medium,
   wherein the content selecting unit selects respective contents corresponding to the series of segment identification information of the key entry indicated by the key pointer of the content related information read out by the related information reading unit.

5. The content playback apparatus according to claim 1, wherein
   the sequence key section is recorded in the recording medium in a form of an interleaved block and each content is stored on a basis of an interleaved unit, and
   the content selecting unit selects each content corresponding to the segment identification information of the key entry on a basis of the interleaved unit.

6. The content playback apparatus according to claim 5, wherein
   the content related information further includes block information which indicates whether the interleaved block is the segment key file or not, and
   the content selecting unit selects respective contents corresponding to the series of segment identification information only when the block information in the content related information read out by the related information reading unit indicates that the interleaved block is the segment key file.

7. The content playback apparatus according to claim 5, wherein the content selecting unit further disables an angle function when the block information in the content related information read out by the related information reading unit indicates that the interleaved block is the segment key file.

8. The content playback apparatus according to claim 7, wherein the content selecting unit proceeds to a process relating with the angle function when the block information in the content related information read out by the related information reading unit indicates that the interleaved block is not the segment key file.

9. The content playback apparatus according to claim 5, wherein each interleaved unit in the sequence key section stores address information alone of the interleaved unit that stores content to be processed next, and
   the content selecting unit selects and plays back the interleaved unit to be processed next designated by the address information when the content playback unit completes the playback of the content.

10. The content playback apparatus according to claim 9, wherein, each interleaved unit in the sequence key section stores the address information corresponding to the segment identification information of itself, and stores a value indicating invalidity corresponding to the segment identification information other than the segment identification information of itself.

11. The content playback apparatus according to claim 10, wherein the content selecting unit selects and plays back the interleaved unit to be processed next by looking up the address information based on the segment identification information of itself when the content playback unit completes the playback of the content.

12. The content playback apparatus according to claim 4, wherein the sequence key section is provided in the video object which corresponds to a Standard content including video content, audio content, and sub picture content.

13. The content playback apparatus according to claim 12, wherein the related information reading unit reads out control information for playback stored in a cell in the recording medium as the content related information.

14. The content playback apparatus according to claim 4, wherein the sequence key section is further provided in the video object which corresponds to an Advanced content including content other than video content, audio content, and sub picture content.

15. The content playback apparatus according to claim 14, wherein the related information reading unit further reads out control information for playback stored in a TMAP in the recording medium as the content related information.

16. A method of content playback comprising:
selecting one segment key file from plural segment key files at playback of content from a sequence key section in a recording medium, the recording medium storing a video object which has n sequence key sections and the segment key files, each sequence key section being groups of contents formed from m pieces of encrypted contents with different minute portions, each segment key file registering n key entries corresponding to each sequence key section, each key entry associating segment identification information that uniquely identifies a content to be played back among the m contents in the sequence key section with a segment key that is used for decrypting a content corresponding to the segment identification information, n and m being natural numbers;
selecting each content corresponding to the segment identification information of the n key entries registered in the selected segment key file;
decrypting each selected content by a segment key corresponding to the segment identification information of each selected content; and
playing back each decrypted content.

17. A computer program product having a computer readable medium including programmed instructions for content playback, wherein the instructions, when executed by a computer, cause the computer to perform:
selecting one segment key file from plural segment key files at playback of content from a sequence key section in a recording medium, the recording medium storing a video object which has n sequence key sections and the segment key files, each sequence key section being groups of contents formed from m pieces of encrypted contents with different minute portions, each segment key file registering n key entries corresponding to each sequence key section, each key entry associating segment identification information that uniquely identifies a content to be played back among the m contents in the sequence key section with a segment key that is used for decrypting a content corresponding to the segment identification information, n and m being natural numbers;
selecting each content corresponding to the segment identification information of the n key entries registered in the selected segment key file;
decrypting each selected content by a segment key corresponding to the segment identification information of each selected content; and
playing back each decrypted content.

* * * * *